United States Patent
Kray et al.

(10) Patent No.: US 11,225,871 B2
(45) Date of Patent: Jan. 18, 2022

(54) TURBINE AIRFOIL WITH PASSIVE MORPHING STRUCTURE

(71) Applicant: General Electric Company, Schenectady, NY (US)

(72) Inventors: Nicholas Joseph Kray, West Chester, OH (US); Narendra Digamber Joshi, Niskayuna, NY (US); Samar Jyoti Kalita, Cincinnati, OH (US); Paul Gerard Marsland, Milford, OH (US); Wayne Allen Spence, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 16/226,703

(22) Filed: Dec. 20, 2018

(65) Prior Publication Data

US 2020/0024956 A1  Jan. 23, 2020

Related U.S. Application Data

(63) Continuation of application No. 14/950,343, filed on Nov. 24, 2015, now Pat. No. 10,196,898.

(51) Int. Cl.
  *F01D 5/14* (2006.01)
  *F01D 11/18* (2006.01)
  (Continued)

(52) U.S. Cl.
  CPC ............... *F01D 5/147* (2013.01); *B22F 5/04* (2013.01); *B22F 7/06* (2013.01); *B22F 10/20* (2021.01); *B33Y 10/00* (2014.12); *B33Y 80/00* (2014.12); *F01D 5/148* (2013.01); *F01D 5/28* (2013.01); *F01D 9/041* (2013.01); *F01D 11/18* (2013.01);
  (Continued)

(58) Field of Classification Search
  CPC .. F01D 5/147; F01D 5/148; F01D 5/28; F05D 2300/50212; B22F 7/06; B22F 5/04; B22F 3/1055; B33Y 10/00; B33Y 80/00
  See application file for complete search history.

(56) References Cited

U.S. PATENT DOCUMENTS 3,038,698 A * 6/1962 Troyer .................... F01D 9/045
                                                          415/12
4,619,580 A * 10/1986 Snyder .................... F01D 5/148
                                                          415/12
(Continued)

FOREIGN PATENT DOCUMENTS

WO   2014105432 A1   7/2014
WO   2015002976 A1   1/2015

OTHER PUBLICATIONS

European Search Report and Opinion issued in connection with corresponding EP Application No. 16200203.4 dated Feb. 21, 2017.
(Continued)

Primary Examiner — Brian P Wolcott
(74) Attorney, Agent, or Firm — Hanley, Flight & Zimmerman, LLC

(57) ABSTRACT

A turbine engine airfoil apparatus, including an airfoil defined by a plurality of airfoil sections arrayed along a stacking axis that extends between a root and a tip, wherein at least two of the airfoil sections spaced apart from each other have differing airfoil section thermal expansion properties.

20 Claims, 5 Drawing Sheets

(51) Int. Cl.
*B22F 5/04* (2006.01)
*B22F 7/06* (2006.01)
*B33Y 80/00* (2015.01)
*B33Y 10/00* (2015.01)
*B22F 10/20* (2021.01)
*F01D 5/28* (2006.01)
*F01D 9/04* (2006.01)
*F04D 29/32* (2006.01)
*F04D 29/54* (2006.01)

(52) U.S. Cl.
CPC ........ *B22F 2207/01* (2013.01); *F04D 29/321* (2013.01); *F04D 29/541* (2013.01); *F05D 2220/32* (2013.01); *F05D 2230/22* (2013.01); *F05D 2230/31* (2013.01); *F05D 2300/50212* (2013.01); *Y02P 10/25* (2015.11)

(56) References Cited

U.S. PATENT DOCUMENTS

| | | | |
|---|---|---|---|
| 4,900,635 A | 2/1990 | Bowen et al. | |
| 7,967,570 B2 | 6/2011 | Shi et al. | |
| 8,011,882 B2 * | 9/2011 | McMillan | F01D 9/041 415/148 |
| 8,202,056 B2 * | 6/2012 | Rice | F01D 7/00 416/229 A |
| 8,702,398 B2 | 4/2014 | Breeze-Stringfellow et al. | |
| 9,650,898 B2 * | 5/2017 | Hayford | F01D 5/28 |
| 2013/0045093 A1 | 2/2013 | Wunderlich et al. | |
| 2013/0302168 A1 | 11/2013 | Kray et al. | |
| 2014/0212263 A1 | 7/2014 | Hayford et al. | |
| 2014/0363305 A1 | 12/2014 | Shah et al. | |
| 2015/0003997 A1 | 1/2015 | Mironets et al. | |

OTHER PUBLICATIONS

European Office Action for application 16200203.4 dated May 7, 2020 (6 pages).
European Patent Office, "Communication pursuant to Article 94(3) EPC," issued in connection with European patent application No. 16200203.4, dated Dec. 1, 2020, 8 pages.
United States Patent and Trademark Office, "Notice of Allowance," issued in connection with U.S. Appl. No. 14/950,343, dated Sep. 21, 2018, 10 pages.
United States Patent and Trademark Office, "Final office action," issued in connection with U.S. Appl. No. 14/950,343, dated Jul. 2, 2018, 24 pages.
United States Patent and Trademark Office, "Non-Final office action," issued in connection with U.S. Appl. No. 14/950,343, dated Mar. 13, 2018, 24 pages.

* cited by examiner

TURBINE AIRFOIL WITH PASSIVE MORPHING STRUCTURE

CROSS-REFERENCE TO RELATED APPLICATION

This application is a continuation of U.S. application Ser. No. 14/950,343, filed on Nov. 24, 2015, titled "TURBINE AIRFOIL WITH PASSIVE MORPHING STRUCTURE", which is hereby expressly incorporated herein by reference in its entirety.

BACKGROUND OF THE INVENTION

This invention relates generally to turbine components, and more particularly to turbine airfoils for use in variable-temperature environments.

A typical gas turbine engine includes a turbomachinery core having a high pressure compressor, a combustor, and a pressure turbine in serial flow relationship. The core is operable in a known manner to generate a primary gas flow. Depending on the particular application, the engine may also include other components such as a fan or booster for generating propulsive thrust, or a power turbine for driving a shaft or a propeller.

The compressor and turbine both include one or more rotor stages each including a plurality of airfoil-shaped blades as well as stationary airfoils. These airfoils are typically of homogenous construction. For example they may be forged from a billet of metal alloy or cast from molten metal alloy.

One problem with existing turbine engine airfoils is that they have a static external surface shape or "fixed geometry" which is most efficient or effective only at one particular gas flow condition or "design point". While variable-geometry airfoils are known, they typically are mechanically complex and require intervention by an operator or automated control system.

Another problem with fixed geometry turbine engine airfoils is that they are subject to aerodynamic, mechanical, and thermal stresses during operation, which may cause them to deflect from their static shape, deviating from their intended efficiency or effectiveness.

BRIEF DESCRIPTION OF THE INVENTION

At least one of the above-noted problems is addressed by a turbine engine airfoil incorporating multiple regions with differing coefficients of thermal expansion ("CTE").

According to one aspect of the technology disclosed herein, a turbine engine airfoil apparatus includes: an airfoil defined by a plurality of airfoil sections arrayed along a stacking axis that extends between a root and a tip, wherein at least two of the airfoil sections spaced apart from each other have differing airfoil section thermal expansion properties.

According to another aspect of the technology disclosed herein, a turbine engine airfoil apparatus includes: an airfoil extending between a root and a tip, and having an exterior surface comprising a concave pressure side wall and a convex suction side wall joined together at a leading edge and at a trailing edge, wherein the airfoil section thermal expansion properties of the airfoil vary from the root to the tip.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
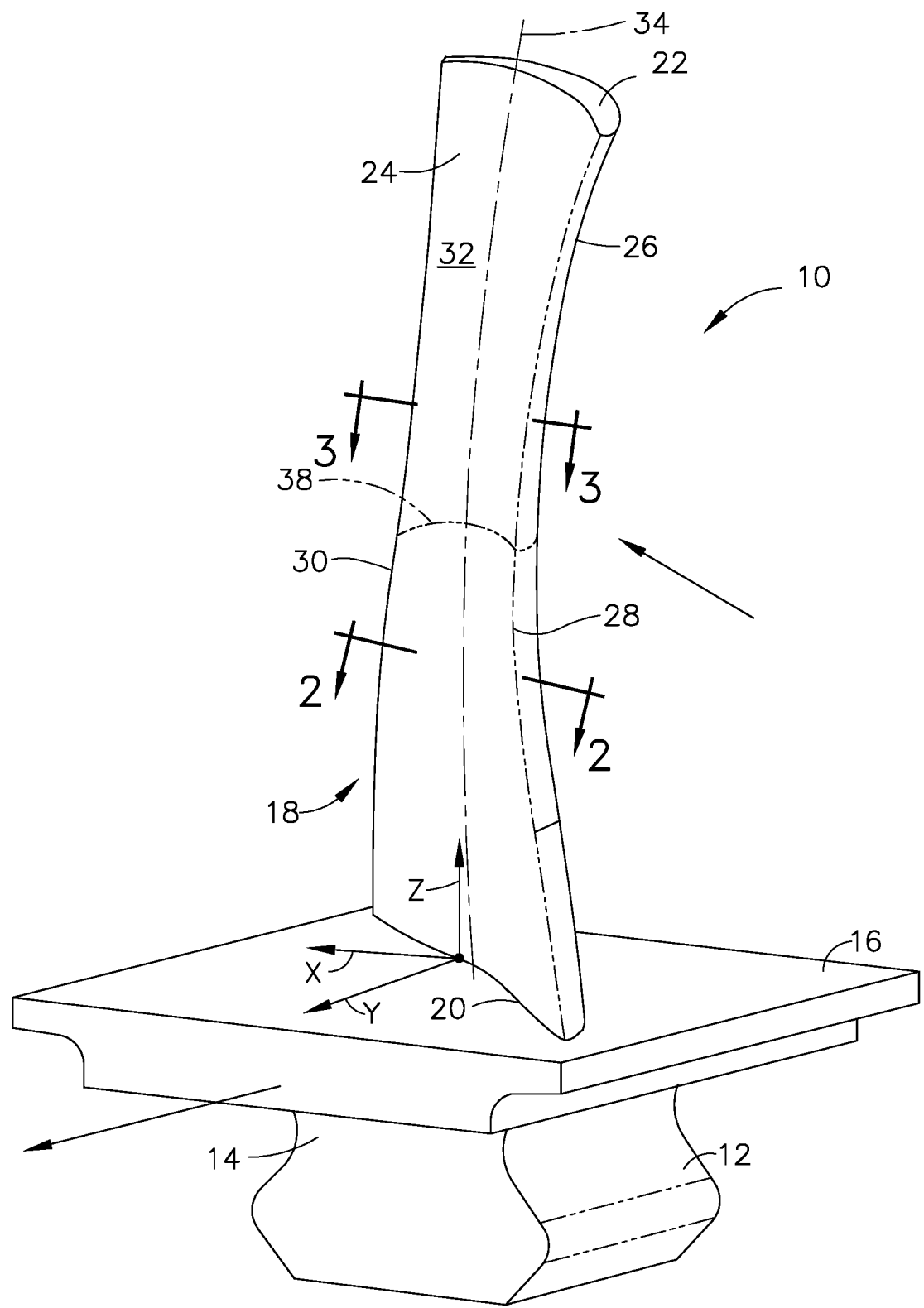
FIG. 1 is a schematic perspective view of an exemplary compressor blade.

Referring to the drawings wherein identical reference numerals denote the same elements throughout the various views, FIG. 1 illustrates an exemplary compressor blade 10. The compressor blade 10 includes a conventional dovetail 12, which may have any suitable form, including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. An airfoil 18 extends generally radially outwardly from the platform 16. The airfoil has a root 20 at the junction of the platform 16 and the airfoil 18, and a tip 22 at its radially outer end. The airfoil 18 has a concave pressure side wall 24 and a convex suction side wall 26 joined together at a leading edge 28 and at a trailing edge 30. Collectively the pressure side wall 24 and the suction side wall 26 define an exterior surface 32 that faces the exterior environment. The exterior surface 32 may take any configuration suitable for imparting flow energy to the surrounding gas stream when the airfoil 18 is rotated by a rotor disk.

The compressor blade 10 is merely one example of a turbine engine airfoil which may incorporate the principles of passive morphing described herein. Nonlimiting examples of other types of turbine engine airfoils include compressor blades which are part of a bladed disk or "blisk", fan or booster airfoils, turbine blades, and stationary compressor stators or turbine vanes.

Figure 2:
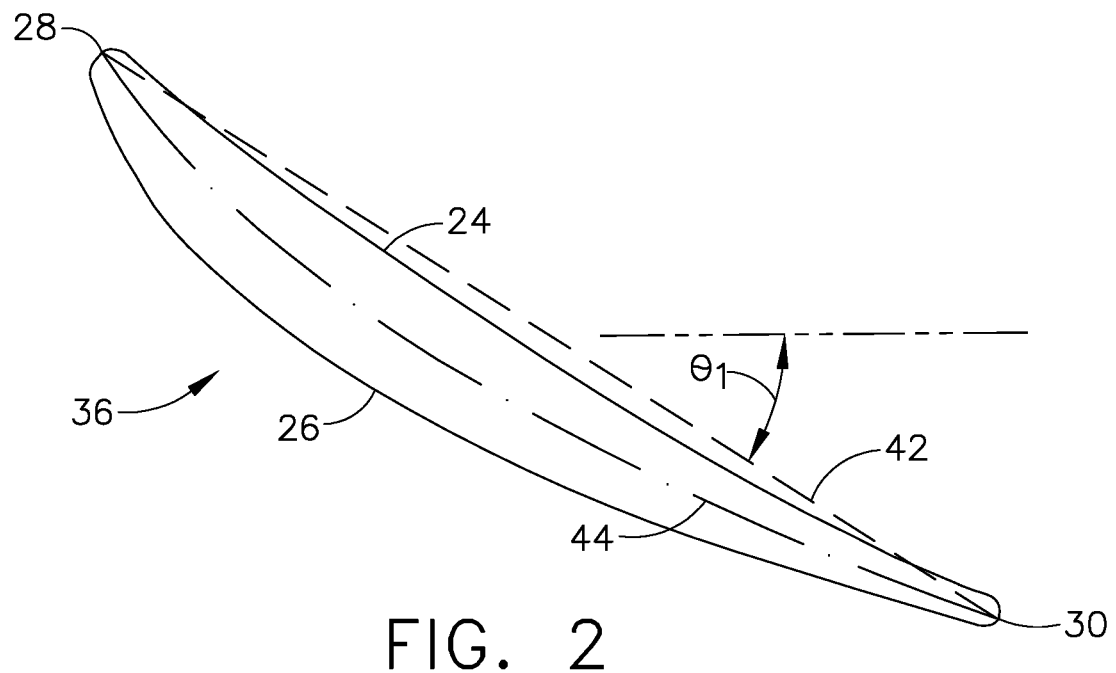
FIG. 2 is a section taken along lines 2-2 of FIG. 1.
Figure 3:
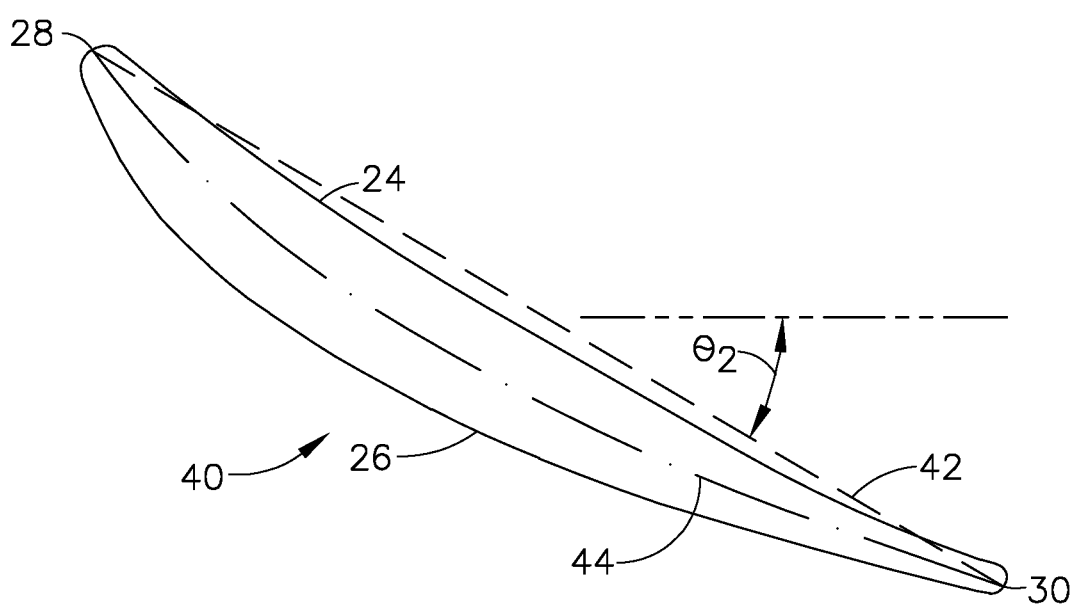
FIG. 3 is a section taken along lines 3-3 of FIG. 1.

The body of the airfoil 18 and its exterior surface 32 may be conceptualized as a "stack" of a plurality of side-by-side airfoil sections arrayed along an imaginary stacking axis 34. For example, FIG. 2 illustrates a first airfoil section 36 taken through an inboard portion of the airfoil 18, for example inboard of a mid-span line 38. FIG. 3 illustrates a second airfoil section 40 taken through an outboard portion of the airfoil 18, for example outboard of the mid-span line 38. In FIGS. 2 and 3, an imaginary chord line 42 extends in a straight line from the leading edge 28 to the trailing edge 30, and an imaginary mean camber line 44 extends from the leading edge 28 to the trailing edge 30, being equidistant from the pressure and suction side walls 24 and 26. An airfoil having a curved mean camber line 44 is said to be "cambered", with a smaller radius of curvature indicating greater camber. An angle between the chord line 42 and an axial direction is referred to as a stagger angle of the airfoil 18, generally designated θ herein.

As illustrated in FIG. 1, the stacking axis 34 need not be linear (i.e. the airfoil 18 may be "bowed") nor is it required to extend in a purely radial direction (i.e. the airfoil 18 may be "leaned" or "swept"). In effect, this causes different airfoil sections to be offset from one another in an axial-tangential plane. Different airfoil sections may also be rotated relative to each other. For example, it can be seen that the first airfoil section 36 is rotated relative to the second airfoil section 40, resulting in the two sections having different stagger angles $\theta_1$, $\theta_2$ respectively. This property may be referred to as "twist".

It is noted that, as used herein, the term "axial" or "longitudinal" refers to a direction parallel to an axis of rotation of a gas turbine engine, corresponding to the direction marked "X" in FIG. 1, while "radial" refers to a direction perpendicular to the axial direction, marked "Z" in FIG. 1, and "tangential" or "circumferential" refers to a direction mutually perpendicular to the axial and tangential directions, marked "Y" in FIG. 1. These directional terms are used merely for convenience in description and do not require a particular orientation of the structures described thereby.

The compressor blade 10 may be made from a material such as a metallic alloy or a ceramic material. All materials, including such alloys, expand or contract in response to a change in temperature. A material property called coefficient of thermal expansion or "CTE" relates the change in size (i.e. volume or linear dimension) of the material to the change in temperatures. Generally, CTE is expressed as $\alpha V=1/V \, (dV/dT)$ or $\alpha L=1/L \, (dL/dT)$, respectively, where $\alpha$ represents the CTE, V volume, L length, and T temperature. Most materials including aerospace alloys have a positive CTE, meaning that their dimensions increase with increasing temperatures, when considered as a homogenous mass, for example a rectangular solid.

The airfoil 18 may be configured to have a passive morphing function. As used herein the term "passive morphing" refers to the ability of the airfoil 18 to change geometry in response to environmental conditions (e.g. gas flow temperature) without intervention of an operator or control system, and without using actuators.

The passive morphing function may be embodied by the selective use of multiple regions in the airfoil 18 having different CTEs. The thermomechanical interaction of these regions of differing CTEs during temperature changes gives rise to forces that deflect airfoil 18 in a desired manner.

In general, passive morphing may be implemented by providing two regions having different CTEs which lie on opposite sides of an axis along which a bending movement is desired. The exact characteristics of the morphing forces may be adjusted, for example, by varying the material composition of each region (to thereby affect CTE), by varying the mass of the opposed regions, and by varying the distance of the opposed regions relative to the axis.

Figure 4:
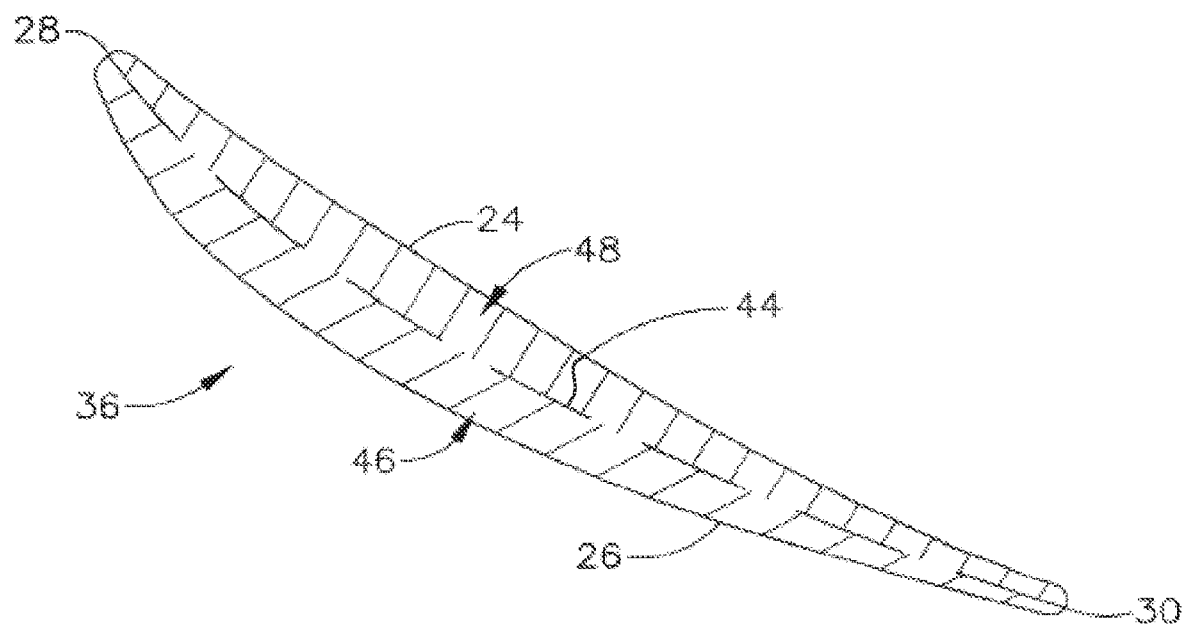
FIG. 4 is a view of the section of FIG. 2, showing multiple regions of an airfoil section.
Figure 5:
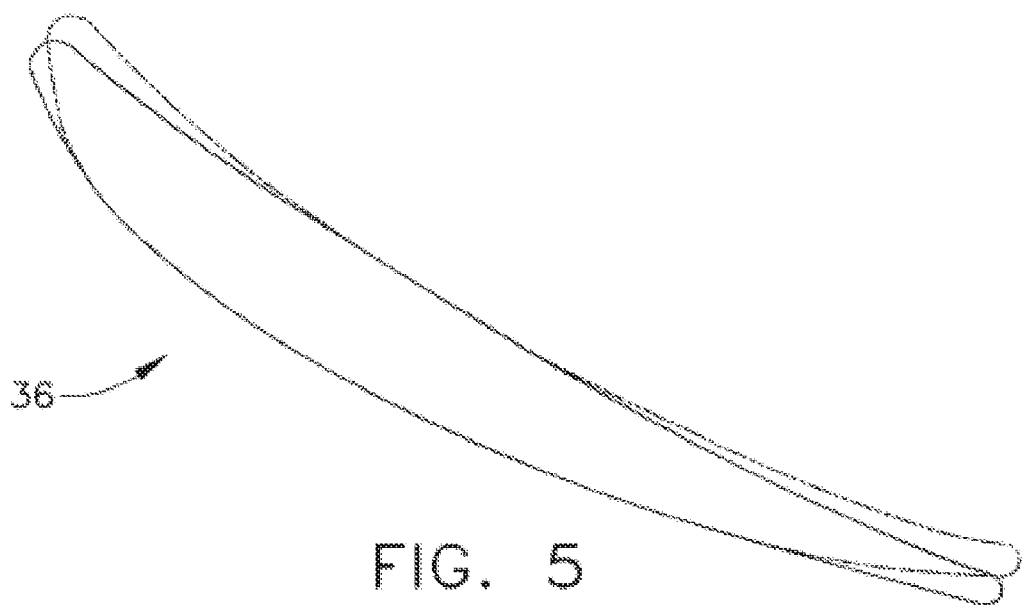
FIG. 5 is a view of the section of FIG. 4, showing an airfoil section in two different operating conditions.

One possible example is described with reference to FIG. 4. The first airfoil section 36 includes first and second regions 46, 48 respectively, which lie on opposite sides of the mean camber line 44. The first region 46 adjoins the suction side wall 26, extends substantially the entire chord from leading edge 28 to trailing edge 30, and has a first CTE. The second region 48 adjoins the pressure side wall 24, extends substantially the entire chord from leading edge 28 to trailing edge 30, and has a second CTE which may be different from the first CTE. The airfoil section 36 will experience varying temperatures, ranging from ambient temperatures (e.g. 15° C./59° F. on an ICAO standard day) when not operating to an operating temperature of at least several hundred degrees (e.g. 500° C./900° F.), while a turbine blade can experience much higher temperatures at design operating conditions. Accordingly, both regions 46 and 48 will experience expansion. FIG. 5 illustrates the first airfoil section 36 with its static shape in solid lines and its morphed shape in phantom lines. If the first region 46 expands more than the second region 48, the camber of the airfoil 18 will tend to increase at high temperatures (shown in FIG. 5). If the second region 48 expands more than the first region 46, the camber of the first airfoil section 36 will tend to decrease (not shown).

Figure 6:
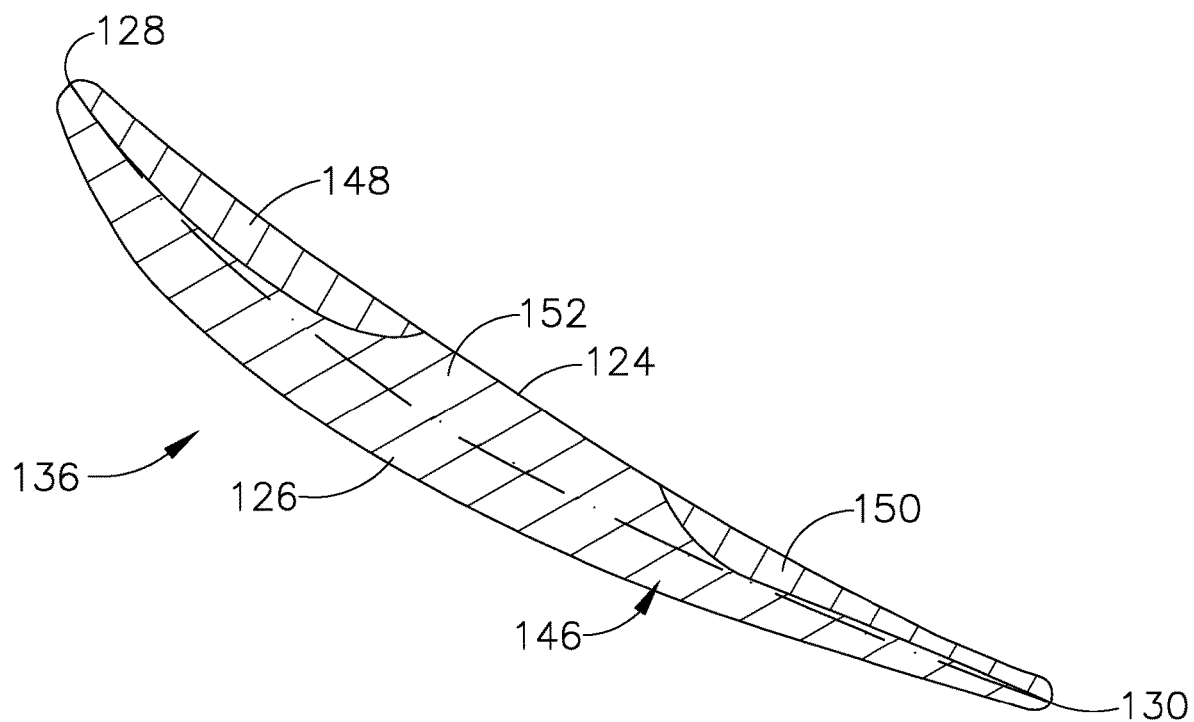
FIG. 6 is a view of an alternative airfoil section, showing multiple regions of an airfoil section.
Figure 7:
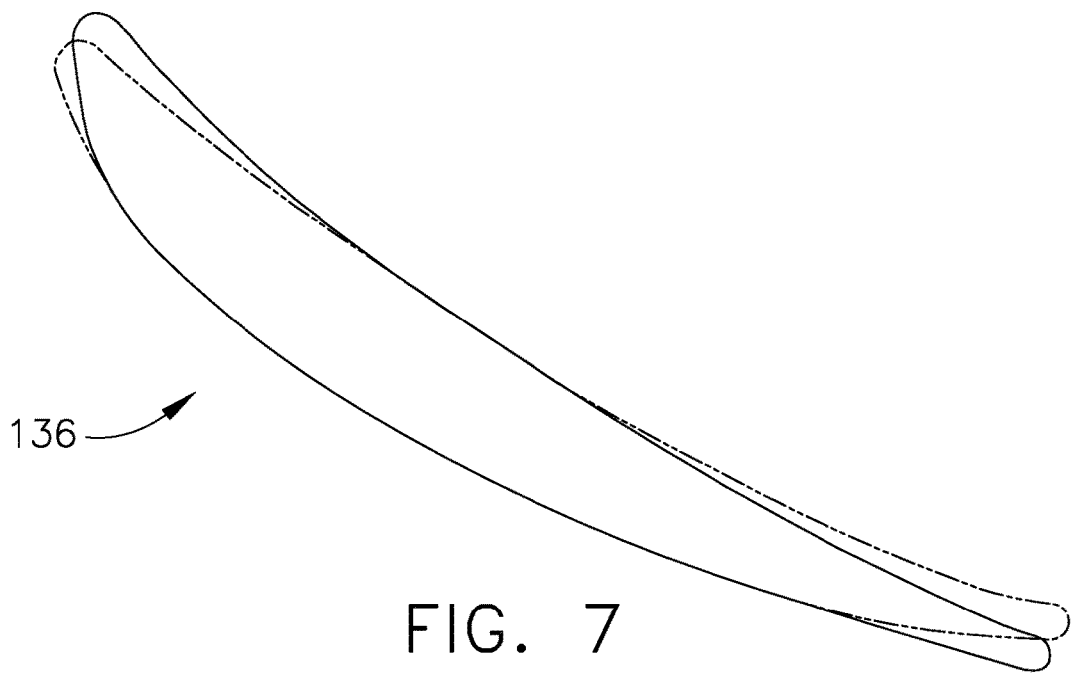
FIG. 7 is a view of the section of FIG. 6, showing an airfoil section in two different operating conditions.

FIG. 6 illustrates another possible example with reference to an alternate airfoil section 136 including opposed pressure and suction side walls 124, 126 extending from a leading edge 128 to a trailing edge 130. The airfoil section 136 includes first, second, and third regions 146, 148, 150 respectively. The first region 146 adjoins the suction side wall 126, extends substantially the entire chord from leading edge 128 to trailing edge 130, has a central portion 152 extending through the full thickness of the airfoil 136, and has a first CTE. The second region 148 adjoins the pressure side wall 124, extends over a portion of the chord from leading edge 128 to the central portion 152, and has a second CTE which may be different from the first CTE. The third region 150 adjoins the pressure side wall 124, extends over a portion of the chord from the central portion 152 to the trailing edge 130, and has a third CTE which may be different from the first CTE. Accordingly, all three regions 146, 148, 150 will experience expansion at high temperatures. FIG. 7 illustrates the airfoil section 136 with its static shape in solid lines and its morphed shape in phantom lines. For example, if the second region 148 expands more than the first region 146, and the third region 150 expands less than the first region 146, the effective stagger angle of the airfoil section 136 will tend to decrease at high temperatures (shown in FIG. 7). If the third region 150 expands more than the first region 146 and the second region expands the stagger angle of the airfoil section 136 will tend to decrease (not shown).

The regions described above and the boundaries between them may extend through the airfoil 18 in any direction (e.g. radial, axial, tangential or combinations thereof). Accordingly, it will be understood that the portions of the airfoil 18 constituting the various regions may have a significant radial extent. Thus a particular contiguous portion of material may define several regions in several sections of the airfoil 18.

In some cases the provision of adjoining regions with different CTEs may result in undesirable thermomechanical stresses between the two regions. Accordingly, a transition zone may be provided between adjacent regions to mitigate those stresses.

Figure 8:
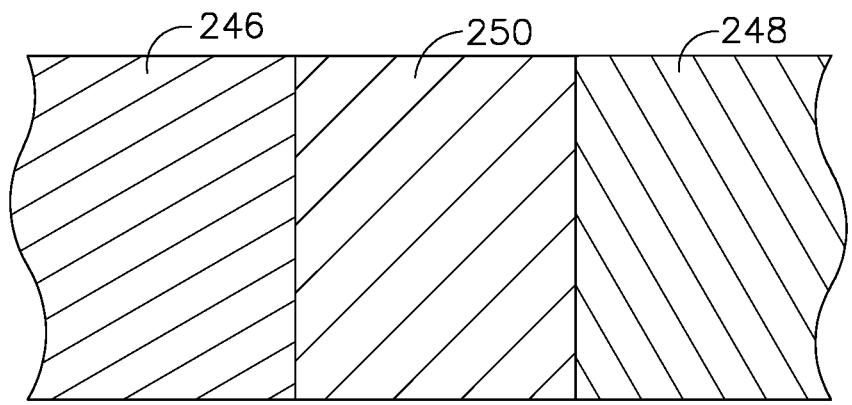
FIG. 8 is a schematic sectional view of a portion of an airfoil including two regions with a transition region disposed therebetween.
Figure 9:
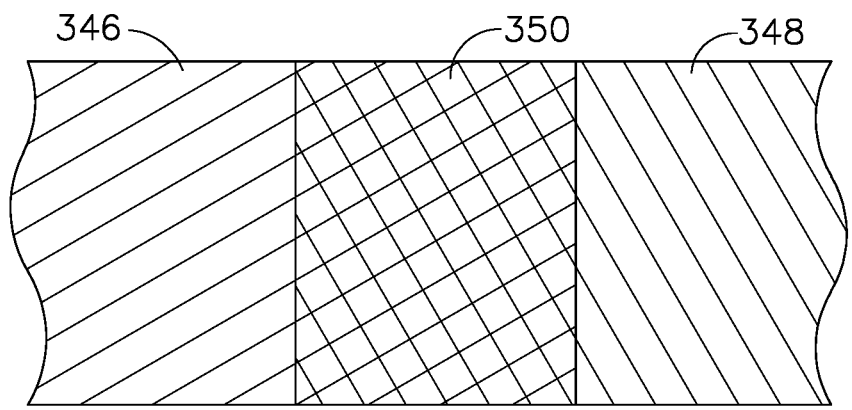
FIG. 9 is a schematic sectional view of a portion of an airfoil including two regions with an alternative transition region disposed therebetween.

For example, as shown in FIG. 8, a transition zone 250 may be embodied as a discrete region disposed between two regions 246, 248 similar to the regions as described above, and having an a CTE which is intermediate to the different CTEs of the two regions 246, 248, As another example, shown in FIG. 9, a transition zone 350 may be embodied as a region disposed between two regions similar to the regions as described above, and having a composition which is a gradient that blends over a width of the transition zone 350, from a composition matching the CTE of the first region 346 to a composition matching CTE of the second region 348.

Figure 10:
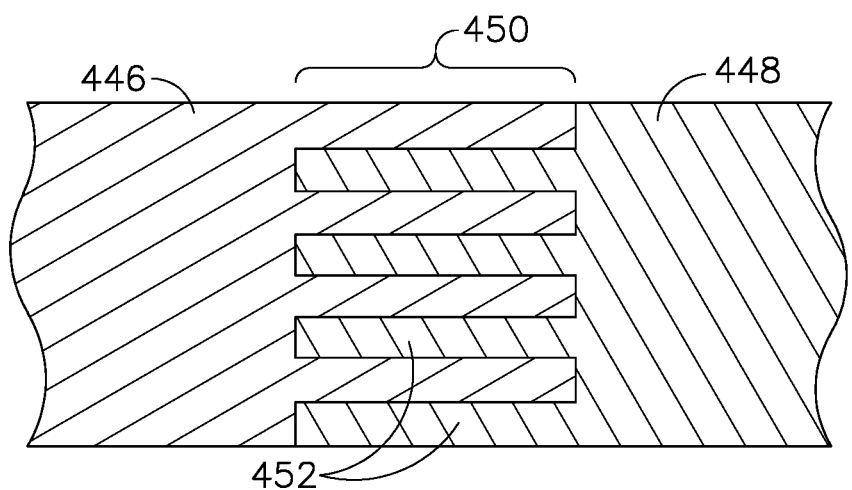
FIG. 10 is a schematic sectional view of a portion of an airfoil including two regions with another alternative transition region disposed therebetween.

As another example, shown in FIG. 10, a transition zone 450 may be embodied as a region disposed between two regions 446, 448 similar to the regions as described above and includes mechanically interlocked or overlapping features 452 of two different CTE regions 446, 448.

The overall thermomechanical behavior of the airfoil section as described above, for example the tendency of airfoil section 36 to change camber, or the tendency of the airfoil section 136 to change stagger angle, may be referred to generally as that airfoil section's "thermal expansion properties".

In one implementation, the airfoil 18 may incorporate several airfoil sections arrayed along the stacking axis 34, wherein two or more airfoil sections spaced apart from each other along the stacking axis 34 have different thermal expansion properties from each other.

In one implementation, the airfoil 18 may incorporate several airfoil sections arrayed along the stacking axis 34, wherein two or more airfoil sections spaced apart from each other along the stacking axis 34 each include multiple regions having different CTEs.

One potential use of the passive morphing principles described above is to provide a countervailing effect against mechanical and aerodynamic effects which tend to change the airfoil 18 from its as-manufactured shape or design intent. For example, aerodynamic loads may tend to de-camber the airfoil 18; passive morphing could be used to counter this effect.

Another potential use of the passive morphing principles described above is to provide a "variable geometry" function, in which the airfoil 18 has a predetermined first shape at low temperatures and a predetermined second shape at high temperatures. This may be done in order to better match the airfoil's shape to its operating conditions.

Turbine engine airfoils as described above are especially suited for production using an additive manufacturing method, as the varying CTE regions may be impractical to manufacture using conventional casting, forging, or machining processes.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD).

As example of an additive build process is as follows. A layer increment of a powder is supplied (e.g. metallic, organic, or ceramic, or polymeric powder). As an example, the layer increment may be as little as about 10 micrometers (0.0003 in.), and potentially much thicker. A directed energy source such as a laser or electron beam is used to melt in the powder a two-dimensional cross-section of the component being built. More specifically, the directed energy source emits a beam and a beam steering apparatus is used to steer or scan the beam over the exposed powder surface in an appropriate pattern. The exposed layer of powder is heated by the beam to a temperature allowing it to melt, flow, and consolidate, both within the top layer and with any lower, previously-solidified layers. Consolidation in additive manufacturing systems can also be achieved by using multiple energy beams. These beams can converge at focus to enable melting/processing or be fired out-of-sync in a manner tailored to materials need and behavior to enable fabrication of structures. This cycle of providing powder and then directed energy melting the powder is repeated until the entire component is complete. The composition of the component may be varied by changing the composition of the powder during the additive manufacturing process, to produce varying layers or sections of the component.

The foregoing has described turbine airfoils incorporating a passive morphing structure. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying potential points of novelty, abstract and drawings), or to any novel one, or any novel combination, of the steps of any method or process so disclosed.

What is claimed is:

1. A turbine engine airfoil apparatus, comprising an airfoil defined by a plurality of airfoil sections arrayed along a stacking axis that extends between a root and a tip, wherein:
    at least two of the plurality of airfoil sections are spaced apart from each other and have differing airfoil section thermal expansion properties, the at least two of the plurality of airfoil sections comprising a first airfoil section comprising a concave pressure side wall and a convex suction side wall joined together at a leading edge and at a trailing edge of the airfoil, and
    the first airfoil section comprises separate regions that are offset from one another on opposite sides of a mean camber line along a chord extending between the leading edge and the trailing edge, the mean camber line defining a radius of curvature in the airfoil, the separate regions having different coefficients of thermal expansion, the separate regions comprising a first region, a second region, and a third region arranged to cause the first airfoil section to change shape in response to a change in temperature,
    the first region adjoining the suction side wall, extending along the chord of the suction side wall from the leading edge to the trailing edge, and having a central portion extending towards the pressure side wall,
    the second region adjoining the pressure side wall and extending over a portion of the chord of the pressure side wall from the leading edge to the central portion, and
    the third region adjoining the pressure side wall and extending over a portion of the chord of the pressure side wall from the central portion to the trailing edge.

2. The apparatus of claim 1, wherein the first airfoil section comprises a transition zone disposed between two regions having different coefficients of thermal expansion, the two regions comprising the first region having a first coefficient of thermal expansion and the second region having a second coefficient of thermal expansion.

3. The apparatus of claim 2 wherein the transition zone has a coefficient of thermal expansion which is intermediate to the first and second coefficients of thermal expansion.

4. The apparatus of claim 2 wherein the transition zone has a coefficient of thermal expansion which is a gradient that blends over a width of the transition zone, from a composition matching the coefficient of thermal expansion of the first region to a composition matching the coefficient of thermal expansion of the second region.

5. The apparatus of claim 2 wherein the transition zone is defined by mechanically at least one of interlocking or overlapping features of the first and second regions.

6. The apparatus of claim 1, wherein the at least two of the plurality of airfoil sections comprises a second airfoil section, the second airfoil section comprising:
a fourth region, the fourth region having a different coefficient of thermal expansion than the third region;
wherein the third and fourth regions are disposed so as to cause the second airfoil section to change shape in response to a temperature change.

7. The apparatus of claim 6 wherein:
the second airfoil section includes a concave pressure side wall and a convex suction side wall joined together at the leading edge and at the trailing edge;
the third region extends along the suction side wall; and
the fourth region extends along the pressure side wall.

8. The apparatus of claim 1 wherein the airfoil is configured to change a camber thereof in response to a temperature change.

9. The apparatus of claim 1 wherein the airfoil is configured to change a stagger angle in response to a temperature change.

10. The apparatus of claim 1 wherein the airfoil is configured to change a twist thereof in response to a temperature change.

11. A turbine engine airfoil apparatus, comprising an airfoil extending in span between a root and a tip, and having an exterior surface comprising a concave pressure side wall and a convex suction side wall joined together at a leading edge and at a trailing edge, wherein:
airfoil section thermal expansion properties of the airfoil vary from the root to the tip,
the airfoil comprises a plurality of airfoil sections arrayed along a stacking axis on opposite sides of a mean camber line, the mean camber line defining a radius of curvature in the airfoil, and
at least one of the plurality of airfoil sections comprises a first region, a second region, and a third region arranged to cause the at least one of the plurality of airfoil sections to change shape in response to a change in temperature,
the first region adjoining the suction side wall, extending along a chord of the suction side wall from the leading edge to the trailing edge, and having a central portion extending towards the pressure side wall,
the second region adjoining the pressure side wall and extending over a portion of a chord of the pressure side wall from the leading edge to the central portion, and
the third region adjoining the pressure side wall and extending over a portion of the chord of the pressure side wall from the central portion to the trailing edge.

12. The apparatus of claim 11, wherein the
the first region has a first coefficient of thermal expansion; and
the second region has a second coefficient of thermal expansion.

13. The apparatus of claim 11 wherein the airfoil comprises four regions, a fourth region having a different coefficient of thermal expansion than an adjacent region.

14. The apparatus of claim 11 wherein the airfoil is configured to change a camber thereof in response to a temperature change.

15. The apparatus of claim 11 wherein the airfoil is configured to change a stagger angle thereof in response to a temperature change.

16. The apparatus of claim 11 wherein the airfoil is configured to change a twist thereof in response to a temperature change.

17. A method of making a turbine engine airfoil, comprising:
using an additive manufacturing process to build up an airfoil extending in span between a root and a tip, and having an exterior surface comprising a concave pressure side wall and a convex suction side wall joined together at a leading edge and at a trailing edge, the method further comprising selectively positioning differing materials within the airfoil, such that airfoil section thermal expansion properties of the airfoil vary from the root to the tip, wherein:
the airfoil includes a plurality of airfoil sections arrayed on opposite sides of a mean camber line along a stacking axis, the mean camber line defining a radius of curvature in the airfoil, and
at least one of the plurality of airfoil sections comprises a first region, a second region, and a third region arranged to cause the at least one of the plurality of airfoil sections to change shape in response to a change in temperature,
the first region adjoining the suction side wall, extending along a chord of the suction side wall from the leading edge to the trailing edge, and having a central portion extending towards the pressure side wall,
the second region adjoining the pressure side wall and extending over a portion of a chord of the pressure side wall from the leading edge to the central portion, and
the third region adjoining the pressure side wall and extending over a portion of the chord of the pressure side wall from the central portion to the trailing edge.

18. The method of claim 17 wherein at least two of the plurality of airfoil sections have differing airfoil section thermal expansion properties.

19. The method of claim 17 wherein the differing materials comprise two or more materials having different coefficients of thermal expansion.

20. The method of claim 17 wherein the differing materials comprise two or more metallic alloys.

* * * * *